United States Patent [19]

Dulog

[11] 3,943,074

[45] Mar. 9, 1976

[54] VINYL PHOSPHONIC ACID-DIVINYL SULFONE COPOLYMER ION EXCHANGE RESIN

[75] Inventor: Lothar G. Dulog, St. Martens-Latem, Belgium

[73] Assignee: S.A. Texaco Belgium N.V., Brussels, Belgium

[22] Filed: June 8, 1973

[21] Appl. No.: 368,136

[52] U.S. Cl. ...... 260/2.2 R; 260/79.3 MU; 260/641
[51] Int. Cl.² ................. C08G 28/00; C08G 30/02
[58] Field of Search ................. 260/2.2 R, 79.3 MU

[56] References Cited
UNITED STATES PATENTS

| | | | |
|---|---|---|---|
| 2,764,563 | 9/1956 | McMaster et al. | 260/2.2 R |
| 3,297,663 | 1/1967 | Herbst et al. | 260/79.3 MU |
| 3,726,839 | 4/1973 | Jin | 260/79.3 MU |

*Primary Examiner*—Harold D. Anderson
*Attorney, Agent, or Firm*—T. H. Whaley; C. G. Ries; Henry W. Archer

[57] ABSTRACT

Disclosed are cross-linked polymer catalysts containing phosphonic acid groups on aliphatic bonds which are useful for hydrating alkenes under moderate temperature and pressure conditions.

4 Claims, No Drawings

VINYL PHOSPHONIC ACID-DIVINYL SULFONE COPOLYMER ION EXCHANGE RESIN

This invention relates to novel polymeric hydration catalysts, to a method for making such catalysts and to an alkene hydration method employing these catalysts.

In the prior art the hydration of olefins such as propylene to alcohols such as isopropanol is known to be catalyzed by ion exchange resins of the type of sulfonated partly cross-linked polystyrene. This catalyst contains its sulfonic acid on the aromatic rings and therefore invariably loses free sulfuric acid on hydrolyzing. This formation of free sulfuric acid causes troublesome corrosion problems in equipment used in the hydration of olefins.

Viewed against the background of the prior art, as above discussed, the present invention provides novel hydrolytically stable ion exchange resin catalysts consisting of a copolymer prepared from a dialkylvinyl phosphonate and a water-soluble diethenyl compound in which the acid groups are attached to aliphatic carbon atoms.

These catalysts can be defined by the following general formula:

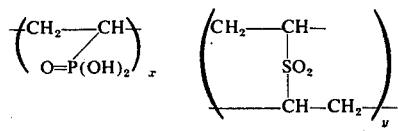

wherein the ratio $x/y$ ranges from about 0.5 to about 1.5.

The catalysts can also be represented in terms of a section of a three dimensional network:

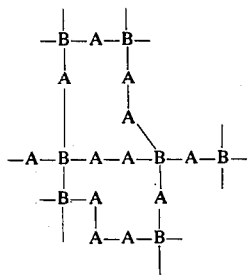

wherein

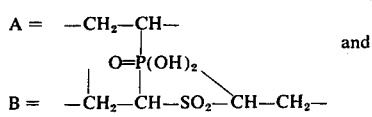

No definite molecular weight is given for the subject compounds because of the absence of reliable methods for determining the molecular weight of insoluble polymers of this type and also because, at least theoretically, their molecular weight may be identical with the particle size of the material. That is to say, one particle of say 1 mm in diameter may have all its building monomers chemically linked to one another and exhibit an enormously high "molecular weight" which is, in fact, the particle weight.

The novel catalysts of the invention can be prepared by copolymerizing a vinyl phosphonate of the formula:

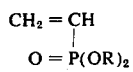

R=lower alkyl such as methyl, ethyl, isopropyl, n-propyl, butyl etc.

by heating in an oxygen-free atmosphere in the presence of a radical initiator under nitrogen with a divinyl surface of the formula:

to form a copolymer of the general formula:

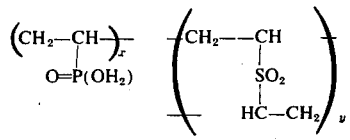

which is heated with concentrated HCl to give the final vinylphosphonic acid calalyst by hydrolysis.

An olefin hydration process in accordance with the present invention consists in heating to between about 100° and 200°C. in an oxygen-free atmosphere at 50 to 200 atmospheres an olefin of the formula:

wherein R is H, or lower alkyl such as methyl or ethyl with water in the presence of the above vinylphosphonic acid to give the corresponding alcohol, ethanol or secondary alcohols.

The invention is further illustrated by the following examples:

EXAMPLE I

PREPARATION OF THE CATALYST

Polymerization

A useful catalyst was prepared by first polymerizing diethylvinylphosphonate and divinylsulfone in a ratio of of 7:3 by weight, in a ratio 6:4, and in a ratio 1:1, see Table I, by a radical initiator such as azoisobutyronitrile (AIBN) at 60°C. under a nitrogen atmosphere.

TABLE I

| Copolymerization of Diethylvinylphosphonate and Divinylsulfone | | | |
|---|---|---|---|
| Vinylphosphonate Divinylsulfone ratio by weight | Time in hrs. | Yield of crosslinked product mol % | Vinylphosphonate Divinylsulfone ratio in the copolymer |
| 7 : 3 | 87 | 68 | 1.37 : 1 |
| 6 : 4 | 20 | 53 | —* |
| 1 : 1 | 44 | 60 | 0.62 : 1 |

*not determined

The cross-linked copolymers so obtained were insoluble in common organic solvents such as ethanol, acetone, dimethylformamide, dimethylsulfoxide, benzene, hexane, in water and in refluxing hydrochloric acid. The ratio diethylvinylphosphonate: divinylsulfone in the copolymer given in Table I was calculated from the elemental analysis data for the copolymers.

EXAMPLE II 1 g (0.0061 mole) Diethylvinylphosphonate, 2 mol percent AIBN (32 mg) and 0.43 g (0.00365 mole) divinylsulfone (ratio vinylphosphonate:divinylsulfone 7 : 3) were heated in a sealed degassed tube at 60°C for 87 hours.

The polymer so obtained is a glassy hard material. It was washed by refluxing during 4 hours with acetone, so that the non-cross-linked polymer fraction goes in solution. The non-soluble fraction was filtered off and dried under vacuo. This fraction 0.8 g (60 mole percent yield) is insoluble in refluxing concentrated hydrochloric acid and common organic solvents, such as hexane, benzene, ethanol, acetone, dimethyl formamide and dimethylsulfoxide.

Elemental analysis: Found %C, 44.19; %H, 6.93; %P, 9.88; %S, 9.82; residue, 2.33%.

EXAMPLE III 50 g (0.305 mole) Diethylvinylphosphonate, 2 mol percent AIBN (1.6 g) and 21.4 g (0.18 mole)) divinylsulfone (ratio vinylphosphonate divinylsulfone 7:3) were heated in a sealed degassed tube of 250 cc at 60°C for 87 hours.

The polymer so obtained is a hard gum; it was washed by refluxing during 5 hours with acetone. The non-soluble fraction was filtered off and dried under vacuo; 48.5 g (68 percent) of a brittle polymer were obtained, insoluble in organic solvents.

EXAMPLE IV 1 g (0.0061 mole) Diethylvinylphosphonate, 2 mol percent AIBN (4.8 mg) and 1 g (0.0085 mole) divinylsulfone (ratio vinylphosphonate divinylsulfone 1:1) were heated in a sealed degassed tube at 60°C for 44 hours.

The polymer so obtained is a glassy hard material. It was washed by refluxing during 4 hours with acetone, so that the non-cross-linked polymer fraction goes in solution. The non-soluble fraction was filtered off and dried under vacuo. This fraction (60 mole percent yield) is insoluble on refluxing in concentrated hydrochloric acid and common organic solvents.

Elemental analysis: Found % C, 43.24; % H, 6.46; % P, 6.87; % S, 14.3; residue, 4.04 %.

The following examples illustrate the hydrolysis of the diethyl vinylphosphonate - divinylsulfone copolymer.

Hydrolysis of the copolymer obtained from 70 percent by weight diethylvinylphosphate and 30 percent divinylsulfone yields the cross-linked polyphosphonic acid in about 70 mole percent. The poly-acid is a brown gel-like substance exhibiting a remarkable water uptake. The ratio vinylphosphonic acid: divinylsulfone in the catalyst calculated from elemental analysis data and from potentiometric titration was found to be 56 percent vinylphosphonic acid units and 44 percent divinylsulfone or 1.37 to 1. This catalyst has an acid capacity of 10.79 meq/g dry resin based on 0.1 N NaOH, and was found to be hydrolytically stable up to 200°C.

This catalyst shows in its infrared spectrum no absorption at the characteristic phosphonic ester absorptions at 1230 cm$^{-1}$ and 1040 cm$^{-1}$.

EXAMPLE V 48.5 g Copolymer, obtained by the co-polymerization of 70 percent by weight of diethylvinylphosphonate and 30 percent by weight of divinylsulfone were heated twice with 100 ml concentrated hydrochloric acid at 110°C during 24 hours. The brown gel-like polymer was filtered off and washed with distilled water. Soxhlet extraction with distilled water during 8 hours removed the remaining hydrochloric acid. After drying 26.1 g of ion exchange resin were isolated.

Analysis: Found % C, 32.58; % H, 5.29; % P, 14.82; % S, 12.23; (residue 2.3%).

EXAMPLE VI

The examples illustrate the hydration of ethylene with the catalysts obtained above.

The cross-linked polyphosphonic acid obtained by hydrolysis of the copolymer made from 30 percent by weight of divinylsulfone and 70 percent by weight of diethylvinylphosphonate was used as hydration catalyst for ethylene and compared with the commercial sulfonic acid type amberlite XE 252 catalyst.

The experiments were performed in a batch-wise operation using an autoclave of 1 l capacity. Catalyst and water introduced into the auotclave, which was then flushed 3 times with nitrogen and once with ethylene. The autoclave was then cooled with liquid nitrogen, olefin was fed in from a reservoir, and the autoclave was closed and pwarmed up to reaction temperature. From the pressure reading and the known free volume, the amount of transferred ethylene was calculated. Stirring was started. After the reaction time lapsed, stirring was stopped, the autoclave cooled to room temperature, the unused olefin blown off, the catalyst filtered off and the yield of alcohol determined by gas chromatography using a flame ionization detector and a Poropak Q colunm at 130°C. For quantitative determinations methanol was used as internal standard.

Table II gives a summary of hydration experiments.

TABLE II

Comparative hydration of ethylene by a polyphosphonic acid (VP-DVS) prepared from diethylvinyl phosphonate (VP) and divinylsulfone (DVS) and hydration of ethylene by Amberlite XE-252[a]

| Ethylene moles | water moles | catalyst gram | temp. °C. | pressure atm. | Hrs. | Wt. % in aqueous phase | Mole % toward $C_2H_4$ |
|---|---|---|---|---|---|---|---|
| 1.8 | 21 | VP-DVS 25 | 200 | 112 | 16 | 0.26 | 1.2 |
| 2.7 | 16.6 | VP-DVS 22 | 220 | 200 | 90 | 5.51 | 13.3 |
| 2.1 | 16.6 | Amb XE 252 91 | 145 | 125 | 16 | 0.13 | 0.5 |
| 5.2 | 16.6 | Amb XE 252 91 | 145 | 200 | 16 | 0.18 | 0.2 |

[a]from Röhm and Haas Company

The above data show that the activity of Amberlite XE 252 at 145°C. is not sufficient to prepare ethanol from ethylene. A pressure of 200 atm and a temperature of 200°C. are adequate for ethylene hydration with the cross-linked vinylphosphonic acid. This catalyst can also be used for propylene hydration under similar conditions.

EXAMPLE VII 22 grams of vinylphosphonic acid catalyst were brought in a 1 l autoclave, and then 300 cc (16.6 mole) of water. The autoclave was then flushed 3 times with nitrogen and once with ethylene. The autoclave was then cooled with liquid nitrogen, olefin was fed in, the autoclave was closed and warmed up to 220°C. From the pressure reading of 200 atm and the known volume the amount of transferred ethylene was calculated. Stirring was started, the run was kept going on for 90 hours. The mixture was allowed to cool down to room temperature, excess olefin blown off, the catalyst filtered off and the yield of ethanol determined by gas chromatography (flame ionization detector) on a Poropak Q column at 130°C. Methanol was used as internal standard. A yield of 13.3 mole percent of ethanol basis ethylene was found.

What is claimed is:

1. A vinylphosphonic copolymer ion exchange resin acid catalyst consisting essentially of repeating units of the formula:

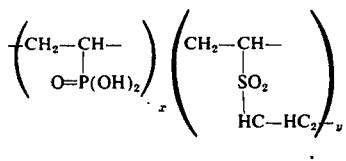

wherein the ratio $x/y$ ranges from about 0.5 to about 1.5.

2. A catalyst according to claim 1 wherein the ratio $x/y$ is 1.37 to 1.

3. A method of making a vinylphosphonic acid catalyst which comprises heating in an oxygen-free atmosphere in the presence of a radical initiator a vinylphosphonate of the formula:

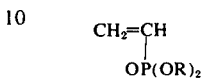

wherein
R = lower alkyl with a divinyl sulfone of the formula:

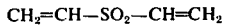

hydrolyzing the resulting product in acid and recovering a solid copolymeric catalyst of the formula:

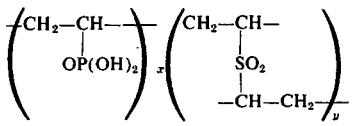

wherein the ratio $x/y$ ranges from about 0.5 to about 1.5.

4. A catalyst according to claim 1 consisting of polymerized vinylphosphonic acid and divinylsulfone in the ratio of 0.62 to 1.

* * * * *